(12) United States Patent
Wagner et al.

(10) Patent No.: US 11,465,388 B2
(45) Date of Patent: Oct. 11, 2022

(54) PEEL STRENGTH BETWEEN DISSIMILAR FABRICS

(71) Applicant: HONEYWELL INTERNATIONAL INC., Morris Plains, NJ (US)

(72) Inventors: Lori L. Wagner, Richmond, VA (US); Gregory A. Davis, Midlothian, VA (US); Brian Duane Arvidson, Chester, VA (US); Henry Gerard Ardiff, Chesterfield, VA (US); Brian Waring, Chester, VA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 709 days.

(21) Appl. No.: 15/834,389

(22) Filed: Dec. 7, 2017

(65) Prior Publication Data
US 2018/0200986 A1 Jul. 19, 2018

Related U.S. Application Data

(60) Provisional application No. 62/446,509, filed on Jan. 15, 2017.

(51) Int. Cl.
B32B 5/22 (2006.01)
B32B 7/12 (2006.01)
(Continued)

(52) U.S. Cl.
CPC .................. B32B 5/22 (2013.01); B32B 7/12 (2013.01); B32B 27/32 (2013.01); B32B 27/40 (2013.01);
(Continued)

(58) Field of Classification Search
CPC .. B32B 5/22; B32B 7/12; B32B 27/40; B32B 37/12; B32B 27/32; B32B 2262/0253; B32B 2305/72; B32B 2307/54; B32B 5/022; B32B 5/024; B32B 5/06; B32B 2262/101; B32B 2262/14; B32B 5/026;
(Continued)

(56) References Cited

U.S. PATENT DOCUMENTS 4,812,140 A 3/1989 Russell et al.
5,938,648 A * 8/1999 LaVon ................ A61F 13/5148
604/358

(Continued)

FOREIGN PATENT DOCUMENTS

EP 1119454 1/2003
EP 962313 8/2006
(Continued)

OTHER PUBLICATIONS

International Search Report for PCT/US2018/012918.

Primary Examiner — Elizabeth C Imani
(74) Attorney, Agent, or Firm — Roberts & Roberts, LLP; Richard S. Roberts, Jr.

(57) ABSTRACT

Hybrid fibrous composite materials incorporating at least two different fabric components and a multicomponent adhesive system for adhering the fabric components together. The adhesive system enhances the bond strength between the fabric components, which would otherwise easily delaminate from each other and peel apart. The components of the adhesive system bond strongly to each other as well as to the fabric elements.

4 Claims, 1 Drawing Sheet

(51) Int. Cl.
*B32B 27/40* (2006.01)
*B32B 37/12* (2006.01)
*B32B 27/32* (2006.01)

(52) U.S. Cl.
CPC ...... *B32B 37/12* (2013.01); *B32B 2262/0253* (2013.01); *B32B 2305/72* (2013.01); *B32B 2307/54* (2013.01)

(58) Field of Classification Search
CPC .... B32B 5/26; B32B 7/04; B32B 7/06; B32B 25/12; B32B 25/14; B32B 25/16; B32B 27/12; B32B 27/30; B32B 27/302; B32B 27/304; B32B 27/306; B32B 27/308; B32B 27/325; B32B 27/327; B32B 27/34; B32B 27/36; B32B 27/365; B32B 2250/04; B32B 2255/02; B32B 2255/10; B32B 2255/26; B32B 2260/021; B32B 2260/046; B32B 2262/0276; B32B 2307/52; B32B 2571/00; B32B 25/20; B32B 27/20; B32B 2250/05; B32B 2260/048; B32B 2262/02; B32B 2262/0223; B32B 2262/0261; B32B 2262/0269; B32B 2307/516; B32B 2307/72; B32B 2439/46; B32B 5/12; B32B 25/08; B32B 27/08; B32B 2250/40; B32B 2270/00; B32B 2274/00; B32B 2307/732; B32B 2437/00; B32B 2307/748; B32B 2405/00

See application file for complete search history.

(56) References Cited

U.S. PATENT DOCUMENTS

| | | | |
|---|---|---|---|
| 6,794,317 | B2 | 9/2004 | Elkouh et al. |
| 7,425,359 | B2 | 9/2008 | Zafiroglu |
| 7,571,493 | B1 | 8/2009 | Purvis et al. |
| 7,875,563 | B2 | 1/2011 | Ardiff et al. |
| 7,993,478 | B2 | 8/2011 | Ardiff et al. |
| 8,236,714 | B2 | 8/2012 | Frankel |
| 2005/0227087 | A1 | 10/2005 | Burgmeier et al. |
| 2011/0076506 | A1 | 3/2011 | Blok et al. |
| 2011/0219943 | A1 | 9/2011 | Arvidson et al. |
| 2012/0207966 | A1 | 8/2012 | Dickson |
| 2013/0115393 | A1 | 5/2013 | Beck |
| 2013/0143460 | A1 | 6/2013 | Beck |
| 2013/0212763 | A1 | 8/2013 | Bhatnagar et al. |
| 2014/0272267 | A1 | 9/2014 | Grunden et al. |
| 2015/0190983 | A1 | 7/2015 | Caicedo-Carvajal et al. |
| 2017/0010072 | A1 | 1/2017 | Sriraman et al. |

FOREIGN PATENT DOCUMENTS

| | | |
|---|---|---|
| EP | 2034088 | 3/2009 |
| JP | 2545301 | 10/1996 |
| JP | 2008209069 | 9/2008 |
| JP | 2016013669 | 1/2016 |
| WO | 2004005020 | 1/2004 |

* cited by examiner

PEEL STRENGTH BETWEEN DISSIMILAR FABRICS

CROSS-REFERENCE TO RELATED APPLICATION

This application claims the benefit of U.S. Provisional Application Ser. No. 62/446,509, filed on Jan. 15, 2017, the disclosure of which is incorporated by reference herein in its entirety.

BACKGROUND

Technical Field

The disclosure relates to hybrid fibrous materials incorporating at least two different fabric components that are adhered together with a multicomponent adhesive system.

Description of the Related Art

High tenacity fibers, such as SPECTRA® polyethylene fibers, are well known as useful for the formation of high performance articles such as ballistic and impact resistant articles because of their very high strength to weight performance. In typical applications, the fibers are formed into woven or non-woven fabrics with the fabrics often being coated with or embedded in a polymeric matrix material to form rigid or flexible composites. Depending on the fabric construction and composition, articles formed from such composites will display varying degrees of impact resistance and resistance to penetration by high energy projectiles such as bullets, shells, shrapnel and the like. For example, U.S. Pat. Nos. 4,623,574; 4,650,710; 4,748,064; 5,552,208; 5,587,230 and 6,642,159, all of which are commonly-owned by Honeywell International Inc., describe ballistic resistant composites formed from high strength UHMEPW fibers. U.S. Pat. Nos. 4,623,574, 4,650,710 and 4,748,064 disclose composite structures comprising high strength fibers embedded in an elastomeric matrix. U.S. Pat. Nos. 5,552,208 and 5,587,230 disclose impact resistant articles comprising layers of high tenacity fibers coated with a rigid, thermosetting matrix composition. U.S. Pat. No. 6,642,159 discloses impact resistant composites comprising a plurality of fabric layers incorporating a thermosetting matrix resin and wherein elastomeric layers are applied between fabric layers to improve interlayer adhesion.

Developments in the art of fiber-based composites are being driven by the need for higher performance, increased functionality and reduced weight. As materials become more sophisticated and complex, so do processing techniques. For example, it is known that the rigidity, impact and anti-ballistic properties of articles formed from ballistic resistant composites are affected by the tensile modulus of the binder polymers coating the fibers. In many known anti-ballistic composites, such as those disclosed U.S. Pat. Nos. 4,623,574, 4,650,710 and 4,748,064 referenced above, it is described that fibrous composites constructed with elastomeric binder polymers having tensile moduli less than about 6,000 psi (41.3 MPa) have superior ballistic properties compared both to composites constructed with higher modulus binder polymers and to the same fiber structure without a binder coating. However, low tensile modulus binder polymers also yield less rigid composites compared to composites comprising high modulus binder polymers. In many applications, particularly those where a composite must function in both anti-ballistic and structural modes, a superior combination of ballistic resistance and rigidity is needed.

To address such complex and varied needs, hybrid composites have been developed that combine different types of fabrics, such as by combining woven and non-woven fabrics into a single composite structure, by combining fabrics of different fiber types, or by combining fabrics having different polymeric matrix types into a single composite structure. For example, U.S. Pat. No. 8,853,105, commonly owned by Honeywell International Inc., teaches a helmet shell comprising a first section of woven, knitted or non-woven fibrous layers that comprise high tenacity abrasive fibers, a second section of woven or knitted fibrous layers comprising polyolefin fibers, and a third section of non-woven fibrous layers comprising polyolefin fibers. In each of the fibrous layers forming each section, the fibrous layers comprise a resin matrix. This 3-section hybrid composite combining the benefits of three different fabric types has been found to have excellent resistance to high energy rifle bullets. U.S. pre-grant publication 2013/0212763, also commonly-owned by Honeywell International Inc., teaches another hybrid construction useful for helmet armor, the construction comprising a first section of woven aramid fabrics attached to a second section of woven, knitted or non-woven polyolefin fabrics, with all fibrous layers comprising a resin matrix. A second embodiment in U.S. pre-grant publication 2013/0212763 further teaches combining a section of aramid fabrics and a section of polyolefin fabrics with a section of glass fiber based fabrics, each section comprising fibers in a resin matrix.

The above hybrid composites are particularly designed to maximize anti-ballistic properties with composite weight and structural considerations, but many other hybrid constructions are known and may enjoy wide ranging benefits depending on the particular characteristics of the component materials. For example, U.S. Pat. No. 7,601,654 teaches multi-component hybrid constructions where layers of fire resistant fiberglass are incorporated to provide fire resistance. As another example, U.S. Pat. No. 7,910,502 teaches a three-panel hybrid construction where one panel incorporates a hydrolytically stable, polar polymer coating that provides structure with desired hydrophobic and oleophobic properties.

While the various benefits of hybrid constructions are widely appreciated, hybridization does have inherent drawbacks that limit its usefulness in some applications. In textile arts specifically, a particular fiber type will have a greater natural affinity for an adhesive that is chemically similar to the fiber type than for an adhesive that is chemically different than the fiber type. Therefore, when combining two dissimilar fabrics that are formed from different fiber types, bond strength is inherently weakened because no single intermediate adhesive will bond strongly to both fabrics. This is of particular concern in the art of ballistic resistant composite armor because poor bonding of the fibrous layers to each other may lead to delamination within the composite material upon a projectile impact or over time, which can yield catastrophic and even deadly results. Therefore, there is a need in the art for a solution where hybrid fibrous composites may be formed from chemically dissimilar fibrous materials without sacrificing bond strength. This disclosure provides a solution to this need.

SUMMARY OF THE DISCLOSURE

The disclosure provides fibrous composite materials and a multicomponent adhesive system for adhering the fabric components together. The multicomponent adhesive system is capable of adhering together two fibrous layers of the same fiber type, but is particularly well suited to adhering hybrid materials comprising fibrous two fibrous layers of dissimilar fiber types. Accordingly, the disclosure more particularly provides hybrid fibrous composite materials incorporating at least two different fibrous layer components and a multicomponent adhesive system for adhering the fabric components together. The unique adhesive system enhances the bond strength between the fabric components, which would otherwise easily delaminate from each other and peel apart, and which has made them unacceptable for use in armor applications. The components of the adhesive system bond strongly to each other as well as to the fabric elements, thereby providing a solution to a significant need in the art.

Particularly, provided is a composite comprising:

a) a first fibrous layer comprising one or more fibrous plies, said first fibrous layer comprising a plurality of multifilament fibers;

b) a second fibrous layer bonded to the first fibrous layer, said second fibrous layer comprising one or more fibrous plies, said second fibrous layer comprising a plurality of multifilament fibers; and c) an intermediate dual layer film positioned between and attached to each of said first fibrous layer and second fibrous layer, said dual layer film bonding the first fibrous layer and the second fibrous layer to each other, wherein said dual layer film comprises a first polymer layer and a second polymer layer, wherein the first polymer layer is positioned in contact with the first fibrous layer and the second polymer layer is positioned in contact with the second fibrous layer, wherein the first polymer layer comprises a first polymer and the second polymer layer comprises a second polymer, wherein the first polymer and second polymer are different, wherein the first polymer layer and the second polymer layer are unified and at least partially fused together wherein polymer molecules from the first polymer layer are commingled with polymer molecules from the second polymer layer, said commingled molecules forming a molecular entanglement region at the interface of the two polymer layers.

Also provided is a composite comprising:

a) a first fibrous layer comprising one or more fibrous plies, said first fibrous layer comprising a plurality of multifilament fibers;

b) a second fibrous layer bonded to the first fibrous layer, said second fibrous layer comprising one or more fibrous plies, said second fibrous layer comprising a plurality of multifilament fibers; and c) an intermediate multi-component adhesive system positioned between and attached to each of said first fibrous layer and second fibrous layer, said multi-component adhesive system bonding the first fibrous layer and the second fibrous layer to each other, wherein said multi-component adhesive system comprises at least a first polymer layer, a second polymer layer and an adhesion promoter disposed between said first polymer layer and said second polymer layer, wherein the first polymer layer is positioned in contact with the first fibrous layer and the second polymer layer is positioned in contact with the second fibrous layer, wherein the first polymer layer comprises a first polymer and the second polymer layer comprises a second polymer, wherein the first polymer and second polymer are different, and wherein the adhesion promoter aids in adhering the first polymer layer and the second polymer layer to each other.

Further provided is a method of forming a composite comprising:

a) providing a first fibrous layer comprising one or more fibrous plies, said first fibrous layer comprising a plurality of multifilament fibers;

b) providing a second fibrous layer comprising one or more fibrous plies, said second fibrous layer comprising a plurality of multifilament fibers; and c) bonding the first fibrous layer to the second fibrous layer with an intermediate dual layer film, wherein said dual layer film comprises a first polymer layer and a second polymer layer, wherein the first polymer layer is positioned in contact with the first fibrous layer and the second polymer layer is positioned in contact with the second fibrous layer, wherein the first polymer layer comprises a first polymer and the second polymer layer comprises a second polymer, wherein the first polymer and second polymer are different, wherein the first polymer layer and the second polymer layer are unified and at least partially fused together wherein polymer molecules from the first polymer layer are commingled with polymer molecules from the second polymer layer, said commingled molecules forming a molecular entanglement region at the interface of the two polymer layers.

Still further provided is a method of forming a composite comprising:

a) providing a first fibrous layer comprising one or more fibrous plies, said first fibrous layer comprising a plurality of multifilament fibers;

b) providing a second fibrous layer comprising one or more fibrous plies, said second fibrous layer comprising a plurality of multifilament fibers; and c) bonding the first fibrous layer to the second fibrous layer with an intermediate multi-component adhesive system, wherein said multi-component adhesive system comprises a first polymer layer, a second polymer layer and an adhesion promoter disposed between said first polymer layer and said second polymer layer, wherein the first polymer layer is positioned in contact with the first fibrous layer and the second polymer layer is positioned in contact with the second fibrous layer, wherein the first polymer layer comprises a first polymer and the second polymer layer comprises a second polymer, wherein the first polymer and second polymer are different, and wherein the adhesion promoter aids in adhering the first polymer layer and the second polymer layer to each other.

DETAILED DESCRIPTION

Figure 1:
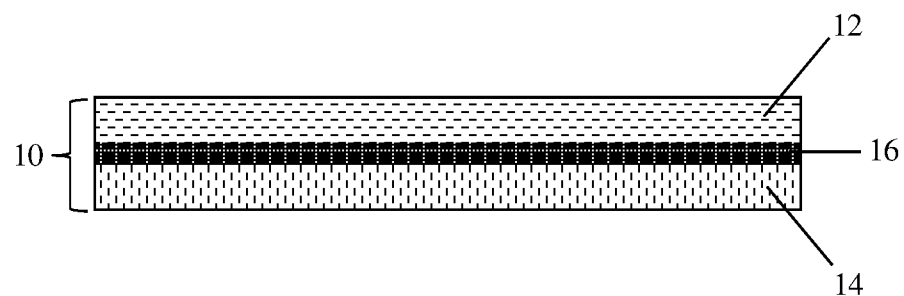
FIG. 1 is a side view schematic representation of a dual layer adhesive film having a molecular entanglement region at the interface between two polymer layers.

The composites provided herein include two or more different fibrous layers, each layer comprising one or more fibrous plies. Each of the fibrous plies of each fibrous layer comprises a plurality of fibers, each ply optionally having a polymeric binder material on the fibers. Most broadly, a first fibrous layer having first and second surfaces and a second fibrous layer having first and second surfaces are bonded together such that the second surface of the first fibrous layer is adhesively bonded to the first surface of the second layer with a multi-component adhesive system.

As used herein, a "fiber" is a long strand of a material, such as a strand of a polymeric material, the length dimension of which is much greater than the transverse dimensions of width and thickness. The fiber is preferably a long, continuous strand rather than a short segment of a strand referred to in the art as a "staple" or "staple fiber." A "strand" by its ordinary definition is a single, thin length of something, such as a thread or fiber. The cross-sections of fibers for use herein may vary widely, and they may be circular, flat or oblong in cross-section. They also may be of irregular or regular multi-lobal cross-section having one or more regular or irregular lobes projecting from the linear or longitudinal axis of the filament. Thus the term "fiber" includes filaments, ribbons, strips and the like having regular or irregular cross-section. A single fiber may be formed from just one filament or from multiple filaments. A fiber formed from just one filament is referred to herein as either a "single-filament" fiber or a "monofilament" fiber, and a fiber formed from a plurality of filaments is referred to herein as a "multifilament" fiber. Multifilament fibers as defined herein preferably include from 2 to about 3000 filaments, more preferably from 2 to 1000 filaments, still more preferably from 30 to 500 filaments, still more preferably from 40 to 500 filaments, still more preferably from about 40 filaments to about 240 filaments and most preferably from about 120 to about 240 filaments. Multifilament fibers are also often referred to in the art as fiber bundles or a bundle of filaments. As used herein, the term "yarn" is defined as a single strand consisting of multiple filaments and is used interchangeably with "multifilament fiber." The term "tenacity" refers to the tensile stress expressed as force (grams) per unit linear density (denier) of an unstressed specimen. The term "initial tensile modulus" refers to the ratio of the change in tenacity, expressed in grams-force per denier (g/d) to the change in strain, expressed as a fraction of the original fiber/tape length (in/in).

The term "denier" is a unit of linear density equal to the mass in grams per 9000 meters of fiber/yarn. In this regard, the fibers forming each layer may be of any suitable denier. For example, fibers may have a denier of from about 50 to about 5000 denier, more preferably from about 200 to 5000 denier, still more preferably from about 300 to about 3000 denier, and most preferably from about 350 to about 1000 denier.

A fibrous "layer" as used herein may comprise any type of uni-axial or multi-axial fabric, including a single-ply of unidirectionally oriented or randomly oriented (e.g., felted) non-woven fibers, a plurality of plies of non-woven fibers that have been consolidated into a single unitary structure, a single-ply of woven fabric, a plurality of woven fabric plies that have been consolidated into a single unitary structure, a single-ply of knitted fabric or a plurality of knitted fabric plies that have been consolidated into a single unitary structure. In this regard, a "layer" describes a generally planar arrangement having an outer front/top (first) surface, which is generally planar, and an outer back/bottom (second) surface, which is also generally planar. The term "fibrous ply" as used herein refers to a single array of unidirectionally oriented fibers, a single woven fabric, a single knitted fabric or a single felted fabric. Each fibrous ply will also have both a first surface and a second surface and a plurality of "fibrous plies" describes more than one ply of the fibrous structures. A "single-ply" of unidirectionally oriented fibers comprises an arrangement of fibers that are aligned in a unidirectional, substantially parallel array. This type of fiber arrangement is also known in the art as a "unitape", "unidirectional tape", "UD" or "UDT." As used herein, an "array" describes an orderly arrangement of fibers or yarns, which is exclusive of woven and knitted fabrics, and a "parallel array" describes an orderly, side-by-side, coplanar parallel arrangement of fibers or yarns. The term "oriented" as used in the context of "oriented fibers" refers to the alignment direction of the fibers rather than to stretching of the fibers. The term "fabric" describes fibrous structures that may include one or more fiber plies, with or without consolidation/molding of the plies. A non-woven fabric formed from unidirectional fibers typically comprises a plurality of non-woven fiber plies that are stacked on each other surface-to-surface in a substantially coextensive fashion and consolidated. When used herein, a "single-layer" structure refers to any monolithic fibrous structure composed of one or more individual plies, wherein multiple plies have been merged by consolidation or molding techniques. The term "composite" refers to a combination of elements and may refer to combinations of fibers, combinations of fibrous plies, and combinations of fibrous layers, each optionally, but preferably, further including a polymeric binder material.

As used herein, a "low tensile strength fiber" is one which has a tenacity of less than 10 g/denier. Suitable low tenacity fibers non-exclusively include nylon fibers, polyester fibers, polypropylene fibers, low tenacity polyolefin fibers, or a combination thereof. Of these fiber types, nylon fibers are most preferred. Fabrics formed from such fibers are widely commercially available. Particularly suitable for use herein are commercially available military grade nylon fabrics, also referred to in the art as mil-spec nylon fabrics. In this regard, military grade or "mil-spec" (military specification) nylon refers to fabrics that meet certain standards set by the U.S. military to be acceptable for sale to the U.S. government. Several different specifications of nylon webbing have been deemed acceptable for use by the U.S. government, including MIL-T-5038 fabric, MIL-W-4088 fabric, MIL-W-5625 fabric, MIL-W-17337 fabric, MIL-W-27065 fabric, MIL-W-43668 fabric, MIL-DTL-32439 fabric, A-A-55301 fabric, A-A-59403 fabric, A-A-549403a fabric, MIL-C-3953 fabric, MIL-C-7219 fabric, MIL-C-10799 fabric, MIL-C-12369 fabric, MIL-C-43128 fabric, MIL-C-43734 fabric, MIL-C-43734D-Class 3 fabric, MIL-C-43375 fabric and Forestry Service (5100-86) fabric, all of which are useful herein for forming one of the fabric layers. Each mil-spec sets forth specific requirements for when the materials may be used in a military garment application, such as a tactical vest/vest cover/plate carrier application, with requirements for properties such as yarn denier, fabric weave density and fabric areal density depending on the intended type of armor application. Some of them also specify a particular camouflage coloration that is deemed acceptable by the military.

One conventionally known type of mil-spec nylon fabric that is particularly useful for forming the first fibrous layer is CORDURA® brand nylon fabric which is commercially available from Invista North America S.A R.L. of Wilmington, Del. (categorized at least under military specification MIL-W-43668/A-A-55301). As discussed herein, such commercially available woven nylon fabrics are sometimes coated with a water repellent resin on at least one its surfaces, such as a water repellent polyurethane, but this coating is optional and is usually noted in the associated mil-spec. Whether designated as mil-spec or not, preferred nylon fabrics are available in a range of deniers and weights, ranging from low denier ripstop fabrics (approximately 30-100 denier) to high denier ballistic fabrics (approximately 400-1500 denier). Particularly preferred fibers for the outer fibrous material are nylon fibers having a denier of from 400 to 2000 denier, more preferably from about 500 to about 1500 denier, and most preferably from about 500 to about 1000 denier.

As used herein, a "high tensile strength" fiber is one which has a tenacity of at least 10 g/denier, an initial tensile modulus of at least about 150 g/denier or more, and an energy-to-break of at least about 8 J/g or more, each as measured by ASTM D2256. Preferred high tensile strength fibers have a tenacity of at least about 15 g/denier, more preferably at least about 20 g/denier, still more preferably at least about 27 g/denier, more preferably having a tenacity of from about 28 g/denier to about 60 g/denier, still more preferably from about 33 g/denier to about 60 g/denier, still more preferably 39 g/denier or more, still more preferably from at least 39 g/denier to about 60 g/denier, still more preferably 40 g/denier or more, still more preferably 43 g/denier or more, or at least 43.5 g/denier, still more preferably from about 45 g/denier to about 60 g/denier, still more preferably at least 45 g/denier, at least about 48 g/denier, at least about 50 g/denier, at least about 55 g/denier or at least about 60 g/denier.

Suitable high tenacity fibers non-exclusively include polyolefin fibers, such as high molecular weight polyethylene fibers, particularly ultra-high molecular weight polyethylene (UHMW PE) fibers, and polypropylene fibers. Also suitable are aramid fibers, particularly para-aramid fibers, polyamide fibers, polyethylene terephthalate fibers, polyethylene naphthalate fibers, extended chain polyvinyl alcohol fibers, extended chain polyacrylonitrile fibers, polybenzoxazole (PBO) fibers, polybenzothiazole (PBT) fibers, liquid crystal copolyester fibers, rigid rod fibers such as M5® fibers, and glass fibers, including electric grade fiberglass (E-glass; low alkali borosilicate glass with good electrical properties), structural grade fiberglass (S-glass; a high strength magnesia-alumina-silicate) and resistance grade fiberglass (R-glass; a high strength alumino silicate glass without magnesium oxide or calcium oxide). Each of these fiber types is conventionally known in the art. Also suitable for producing polymeric fibers are copolymers, block polymers and blends of the above materials.

The most preferred high tenacity fiber types are polyethylene fibers (particularly extended chain polyethylene fibers), aramid fibers, PBO fibers, liquid crystal copolyester fibers, polypropylene fibers (particularly highly oriented extended chain polypropylene fibers), polyvinyl alcohol fibers, polyacrylonitrile fibers, glass fibers and rigid rod fibers, particularly M5® rigid rod fibers. Specifically most preferred are ultra-high molecular weight polyethylene fibers and para-aramid fibers.

In the case of polyethylene, preferred fibers are extended chain polyethylenes having molecular weights of at least 300,000, preferably at least one million and more preferably between two million and five million. Such extended chain polyethylene (ECPE) fibers may be grown in solution spinning processes such as described in U.S. Pat. No. 4,137,394 or 4,356,138, which are incorporated herein by reference, or may be spun from a solution to form a gel structure, such as described in U.S. Pat. Nos. 4,413,110; 4,536,536; 4,551,296; 4,663,101; 5,006,390; 5,032,338; 5,578,374; 5,736,244; 5,741,451; 5,958,582; 5,972,498; 6,448,359; 6,746,975; 6,969,553; 7,078,099; 7,344,668 and U.S. patent application publication 2007/0231572, all of which are incorporated herein by reference. Particularly preferred fiber types are any of the UHMW polyethylene fibers sold under the trademark SPECTRA® from Honeywell International Inc. SPECTRA® fibers are well known in the art. Other useful polyethylene fiber types also include and DYNEEMA® UHMW PE yarns commercially available from Royal DSM N.V. Corporation of Heerlen, The Netherlands.

Particularly preferred methods for forming UHMW PE fibers are processes that are capable of producing UHMW PE fibers having tenacities of at least 39 g/denier, most preferably where the fibers are multi-filament fibers. The most preferred processes include those described in commonly-owned U.S. Pat. Nos. 7,846,363; 8,361,366; 8,444,898; 8,747,715; as well as U.S. publication no. 2011-0269359, the disclosures of which are incorporated by reference herein to the extent consistent herewith. Such processes are called "gel spinning" or "solution spinning" processes, wherein a solution of ultra-high molecular weight polyethylene and a solvent is formed, followed by extruding the solution through a multi-orifice spinneret to form solution filaments, cooling the solution filaments into gel filaments, and extracting the solvent to form dry filaments. These dry filaments are grouped into bundles which are referred to in the art as either fibers or yarns. The fibers/yarns are then stretched (drawn) up to a maximum drawing capacity to increase their tenacity.

Preferred aramid (aromatic polyamide) fibers are well known and commercially available, and are described, for example, in U.S. Pat. No. 3,671,542. For example, useful aramid filaments are produced commercially by DuPont under the trademark of KEVLAR®. Also useful herein are poly(m-phenylene isophthalamide) fibers produced commercially by DuPont of Wilmington, Del. under the trademark NOMEX® and fibers produced commercially by Teijin Aramid Gmbh of Germany under the trademark TWARON®; aramid fibers produced commercially by Kolon Industries, Inc. of Korea under the trademark HERACRON®; p-aramid fibers SVM™ and RUSAR™ which are produced commercially by Kamensk Volokno JSC of Russia and ARMOS™ p-aramid fibers produced commercially by JSC Chim Volokno of Russia.

Suitable PBO fibers are commercially available and are disclosed for example in U.S. Pat. Nos. 5,286,833, 5,296,185, 5,356,584, 5,534,205 and 6,040,050, each of which is incorporated herein by reference. Suitable liquid crystal copolyester fibers are commercially available and are disclosed, for example, in U.S. Pat. Nos. 3,975,487; 4,118,372 and 4,161,470, each of which is incorporated herein by reference, and including VECTRAN® liquid crystal copolyester fibers commercially available from Kuraray Co., Ltd. of Tokyo, Japan. Suitable polypropylene fibers include highly oriented extended chain polypropylene (ECPP) fibers as described in U.S. Pat. No. 4,413,110, which is incorporated herein by reference. Suitable polyvinyl alcohol (PV-OH) fibers are described, for example, in U.S. Pat. Nos. 4,440,711 and 4,599,267 which are incorporated herein by reference. Suitable polyacrylonitrile (PAN) fibers are disclosed, for example, in U.S. Pat. No. 4,535,027, which is incorporated herein by reference. Each of these fiber types is conventionally known and is widely commercially available. M5® fibers are formed from pyridobisimidazole-2,6-diyl(2,5-dihydroxy-p-phenylene) and were most recently manufactured by Magellan Systems International of Richmond, Va. and are described, for example, in U.S. Pat. Nos. 5,674,969, 5,939,553, 5,945,537, and 6,040,478, each of which is incorporated herein by reference. The term "rigid rod" fibers is not limited to such pyridobisimidazole-based fiber types, and many PBO and aramid fiber varieties are often referred to as rigid rod fibers. Commercially available glass fibers include S2-Glass® S-glass fibers commercially available from AGY of Aiken, S.C., HiPerTex™ E-Glass fibers, commercially available from 3B Fibreglass of Battice, Belgium, and VETROTEX® R-glass fibers from Saint-Gobain of Courbevoie, France.

Both the low tenacity fibers of the first fibrous layer and the high tenacity fibers of the second fibrous layer may be of any suitable denier. Preferred fiber deniers for the low tenacity fibers are from about 400 to about 2000 denier, more preferably from about 500 to about 1500 denier, and most preferably from about 500 to about 1000 denier. Nylon fibers having a denier of 500 or 1000 are particularly preferred low tenacity fibers. Preferred fiber deniers for the high tenacity fibers may be from about 50 to about 5000 denier, more preferably from about 200 to 5000 denier, still more preferably from about 300 to about 3000 denier, and most preferably from about 350 to about 1000 denier, with 375 denier and 400 denier UHMW polyethylene fibers or para-aramid fibers being most preferred high tenacity fibers.

Each of the fibrous materials of the disclosure may individually comprise any type of uni-axial or multi-axial fabric, including woven fabrics, non-woven fabrics formed from unidirectionally oriented fibers, non-woven felted fabrics formed from randomly oriented fibers, or knitted fabrics.

Woven fabrics may be formed using techniques that are well known in the art using any fabric weave, such as plain weave, crowfoot weave, basket weave, satin weave, twill weave, three dimensional woven fabrics, and any of their several variations. Plain weave is most common, where fibers are woven together in an orthogonal 0°/90° orientation with warp fibers oriented perpendicular to weft (fill) fibers, and is preferred. Knit fabric structures are constructions composed of intermeshing loops, with the four major types being tricot, raschel, net and oriented structures. Due to the nature of the loop structure, knits of the first three categories are not as suitable as they do not take full advantage of the strength of a fiber. Oriented knitted structures, however, use straight inlaid yarns held in place by fine denier knitted stitches. The fibers are very straight without the crimp effect found in woven fabrics due to the interlacing effect on the yarns. These laid in yarns can be oriented in a monoaxial, biaxial or multi-axial direction depending on the engineered requirements. It is preferred that the specific knit equipment used in laying in the load bearing yarns is such that the yarns are not pierced through.

Non-woven unidirectional fibrous ply constructions are also conventional in the art and methods of their fabrication are also conventional. Such conventional methods may be employed to fabricate all or any of the fibrous plies of the disclosure that are desired to have a non-woven unidirectional construction. For example, in a preferred method of forming a non-woven unidirectional fibrous ply, a plurality of fibers are arranged into an array, typically being arranged as a fiber web comprising a plurality of fibers aligned in a substantially parallel, unidirectional array. In a typical process, fiber bundles are supplied from a creel and led through guides and one or more spreader bars into a collimating comb. This is typically followed by coating the fibers with a polymeric binder material. A typical fiber bundle will have from about 30 to about 2000 individual fibers. The spreader bars and collimating comb disperse and spread out the bundled fibers, reorganizing them side-by-side in a coplanar fashion. Ideal fiber spreading results in the individual filaments or individual fibers being positioned next to one another in a single fiber plane, forming a substantially unidirectional, parallel array of fibers without fibers overlapping each other.

Felts may also be formed by one of several techniques known in the art. A felt is a non-woven network of randomly oriented fibers, preferably at least one of which is a discontinuous fiber, preferably a staple fiber having a length ranging from about 0.25 inch (0.64 cm) to about 10 inches (25.4 cm). Conventional methods include carding, fluid laying, melt blowing and spin laying.

The first fibrous layer, second fibrous layer and any other optional fibrous layers may each may be the same or different in fabric structure (i.e., woven, non-woven or knit) relative to each other. In one preferred embodiment, composite articles are formed by a combination of different types of fabric structures. For example, in one preferred embodiment, the first fibrous layer comprises a plurality of (consolidated) woven fibrous plies and the second fibrous layer comprises a plurality of (consolidated) unidirectional non-woven fibrous plies.

In yet another embodiment, the first and second fibrous layers, and any other optional fibrous layers, are woven fabrics formed with compressed fibers that have been transformed into fibrous tapes as described in, for example, commonly-owned U.S. Pat. Nos. 8,263,119; 8,697,220; 8,685,519; 8,852,714; 8,906,485; 9,138,961 and 9,291,440, each of which is incorporated herein by reference to the extent consistent herewith. U.S. Pat. Nos. 9,138,961 and 9,291,440 also disclose non-fibrous tapes that may be useful herein as substitutes for the multi-filament fibers of one or more of the fibrous plies described herein. In this regard, the term "tape" refers to a flat, narrow, monolithic strip of material having a length greater than its width and an average cross-sectional aspect ratio, i.e. the ratio of the greatest to the smallest dimension of cross-sections averaged over the length of the tape article, of at least about 3:1. A fibrous tape is a tape that comprises one or more filaments, and a non-fibrous tape is a tape that is not formed from filaments but is formed from strips of polymer, for example, strips of polymer formed by slicing a polymer film. Like fibers, the tapes may be of any suitable denier, preferably having a denier of from about 50 to about 30,000, more preferably from about 200 to 10,000 denier, still more preferably from about 650 to about 2000 denier, and most preferably from about 800 to about 1500 denier.

The fibers forming each fibrous layer of the disclosure are preferably, but not necessarily, at least partially coated with a polymeric binder material. The polymeric binder material is also commonly referred to in the art as a polymeric "matrix" material. These terms are conventionally known in the art and describe a material that binds fibers together, either by way of its inherent adhesive characteristics or after being subjected to well-known heat and/or pressure conditions. As used herein, a "polymeric" binder or matrix material includes resins and rubber. When present, the polymeric binder/matrix material either partially or substantially coats the individual fibers forming a fibrous layer, preferably substantially coating (greater than 90% surface area coverage) each of the individual filaments/fibers forming a fibrous ply or fibrous layer, or fully encapsulating each of the individual filaments/fibers forming a fiber ply or fibrous layer.

Suitable polymeric binder materials include both low tensile modulus, elastomeric materials and high tensile modulus materials. As used herein throughout, the term tensile modulus means the modulus of elasticity, which for polymeric binder materials is measured by ASTM D638. A low or high modulus binder may comprise a variety of polymeric and non-polymeric materials. For the purposes of this disclosure, a low modulus elastomeric material has a tensile modulus measured at about 6,000 psi (41.4 MPa) or less according to ASTM D638 testing procedures. A low modulus polymer is preferably an elastomer having a tensile modulus of about 4,000 psi (27.6 MPa) or less, more preferably about 2400 psi (16.5 MPa) or less, still more preferably 1200 psi (8.23 MPa) or less, and most preferably is about 500 psi (3.45 MPa) or less. The glass transition temperature (Tg) of the low modulus elastomeric material is preferably less than about 0° C., more preferably the less than about −40° C., and most preferably less than about −50° C. The low modulus elastomeric material also has a preferred elongation to break of at least about 50%, more preferably at least about 100% and most preferably at least about 300%. Whether a low modulus material or a high modulus material, in addition to the colorant, the polymeric binder may also include fillers such as carbon black or silica, may be extended with oils, or may be vulcanized by sulfur, peroxide, metal oxide or radiation cure systems as is well known in the art.

A wide variety of materials and formulations may be utilized as a low modulus polymeric binder. Representative examples include polyethylene, polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, polyamides (useful with some fiber types), acrylonitrile butadiene styrene, polycarbonates, and combinations thereof, as well as other low modulus polymers and copolymers curable below the melting point of the fiber. Also useful are blends of different elastomeric materials, or blends of elastomeric materials with one or more thermoplastics.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2-10) or radial configuration copolymers of the type $R\text{-}(BA)_x$ (x=3-150); wherein A is a block from a polyvinyl aromatic monomer and B is a block from a conjugated diene elastomer. Many of these polymers are produced commercially by Kraton Polymers of Houston, Tex., including low modulus polystyrene-polyisoprene-polystyrene block copolymers sold under their trademark KRATON®. Also useful are resin dispersions of styrene-isoprene-styrene (SIS) block copolymer sold under the trademark PRINLIN® and commercially available from Henkel Technologies, based in Dusseldorf, Germany.

High modulus, rigid materials generally have an initial tensile modulus greater than 6,000 psi. Useful high modulus, rigid polymeric binder materials include polyurethanes (both ether and ester based), epoxies, polyacrylates, phenolic/polyvinyl butyral (PVB) polymers, vinyl ester polymers, styrene-butadiene block copolymers, as well as mixtures of polymers such as vinyl ester and diallyl phthalate or phenol formaldehyde and polyvinyl butyral. Also useful is a thermosetting polymer that is soluble in carbon-carbon saturated solvents such as methyl ethyl ketone, and possessing a high tensile modulus when cured of at least about $1\times10^6$ psi (6895 MPa) as measured by ASTM D638. Also useful are the binder materials described in U.S. Pat. No. 6,642,159, the disclosure of which is incorporated herein by reference.

Most specifically preferred binder polymers are polar resins or polar polymers, particularly polyurethanes within the range of both soft and rigid materials at a tensile modulus ranging from about 2,000 psi (13.79 MPa) to about 8,000 psi (55.16 MPa). Preferred polyurethanes are applied as aqueous polyurethane dispersions that are most preferably, but not necessarily, cosolvent free. Such includes aqueous anionic polyurethane dispersions, aqueous cationic polyurethane dispersions and aqueous nonionic polyurethane dispersions. Particularly preferred are aqueous anionic polyurethane dispersions; aqueous aliphatic polyurethane dispersions, and most preferred are aqueous anionic, aliphatic polyurethane dispersions, all of which are preferably cosolvent free dispersions. Such includes aqueous anionic polyester-based polyurethane dispersions; aqueous aliphatic polyester-based polyurethane dispersions; and aqueous anionic, aliphatic polyester-based polyurethane dispersions, all of which are preferably cosolvent free dispersions. Such also includes aqueous anionic polyether polyurethane dispersions; aqueous aliphatic polyether-based polyurethane dispersions; and aqueous anionic, aliphatic polyether-based polyurethane dispersions, all of which are preferably cosolvent free dispersions. Similarly preferred are all corresponding variations (polyester-based; aliphatic polyester-based; polyether-based; aliphatic polyether-based, etc.) of aqueous cationic and aqueous nonionic dispersions. Most preferred is an aliphatic polyurethane dispersion having a modulus at 100% elongation of about 700 psi or more, with a particularly preferred range of 700 psi to about 3000 psi. More preferred are aliphatic polyurethane dispersions having a modulus at 100% elongation of about 1000 psi or more, and still more preferably about 1100 psi or more. Most preferred is an aliphatic, polyether-based anionic polyurethane dispersion having a modulus of 1000 psi or more, preferably 1100 psi or more.

When a fibrous layer of the disclosure does include a binder, the total weight of the binder comprising the particular fibrous layer preferably comprises from about 2% to about 50% by weight, more preferably from about 5% to about 30%, more preferably from about 7% to about 20%, and most preferably from about 14% to about 20% by weight of the fibers plus the weight of the binder. A lower binder content is appropriate for woven and knitted fibrous layers, wherein a polymeric binder content of greater than zero but less than 10% by weight of the fibers plus the weight of the binder is typically most preferred, but this is not intended as strictly limiting. For example, phenolic/PVB impregnated woven aramid fabrics are sometimes fabricated with a higher resin content of from about 20% to about 30%, although about 12% content is typically preferred. In this regard, weaving or knitting of fabrics is typically performed prior to coating the fibers of a woven fabric with a polymeric binder, wherein the fabrics are thereafter impregnated with the binder.

Methods for applying a polymeric binder material to fibers to thereby form impregnated fibrous plies/layers are well known and readily determined by one skilled in the art. The term "impregnated" is considered herein as being synonymous with "embedded," "coated," or otherwise applied with a polymeric coating where the polymeric material diffuses into the fiber ply/layer and is not simply on a surface of the ply/layer. Any appropriate application method may be utilized to apply the polymeric binder material and particular use of a term such as "coated" is not intended to limit the method by which it is applied onto the filaments/fibers. Useful methods include, for example, spraying, extruding, pad coating, dip coating or roll coating polymers or polymer solutions onto the fibers, as well as transporting the fibers through a molten polymer or polymer solution. Most preferred are methods that substantially coat or encapsulate each of the individual fibers and cover all or substantially all of the fiber surface area with the polymeric binder material.

Whether the fibrous ply constructions are unidirectional non-woven, felted non-woven, woven, knitted, or a combination thereof, when a single fibrous layer component (e.g. the first fibrous layer or the second fibrous layer) comprises a plurality of merged fibrous plies, the plies may be merged together according to conventional methods in the art. In this regard, a plurality of single plies of the selected fibrous ply type are stacked on top of each other in coextensive fashion and merged, i.e. consolidated, together. When a particular fibrous layer comprises felted non-woven, woven or knitted fibrous plies, each fibrous layer preferably includes from about 1 to about 100 fibrous plies, more preferably from about 2 to about 20 fibrous plies, and most preferably from about 2 to about 10 fibrous plies. When the fibrous layer comprises a plurality of unidirectional non-woven fibrous plies, it is typical for a plurality of such plies to first be formed into a 2-ply or 4-ply unidirectional non-woven fiber "pre-preg" or "pre-preg layer," prior to combining a plurality of such "pre-pregs" or "pre-preg layers" together to form the fibrous layer. Each pre-preg typically includes from 2 to about 6 fibrous plies, typically being cross-plied at 0°/90°, but may include as many as about 10 to about 20 fibrous plies as may be desired for various applications, with each pre-preg also preferably being cross-plied relative to other pre-pregs at alternating 0°/90° orientations. When a fibrous layer comprises such non-woven unidirectional fiber "pre-pregs," it preferably comprises from 1 to about 100 pre-pregs, more preferably from about 2 to about 20 pre-pregs, and most preferably from about 2 to about 10 pre-pregs, each of which preferably comprises two unidirectional plies. The plies forming each pre-preg are typically merged together with a polymeric binder, as discussed herein.

With particular regard to fibrous layers comprising a plurality of unidirectional non-woven fibrous plies, it is conventionally known in the art to coextensively stack individual fibrous plies upon each other such that the unidirectionally oriented fibers in each fibrous ply are oriented in a non-parallel longitudinal fiber direction relative to the longitudinal fiber direction of each adjacent ply. Most typically, the fibrous plies are cross-plied orthogonally at 0° and 90° angles wherein the angle of the fibers in even numbered layers is preferably substantially the same and the angle of the fibers in odd numbered layers is preferably substantially the same, but adjacent plies can be aligned at virtually any angle between about 0° and about 90° with respect to the longitudinal fiber direction of another ply. For example, a five ply non-woven structure may have plies oriented at a 0°/45°/90°/45°/0° or at other angles. Such rotated unidirectional alignments are described, for example, in U.S. Pat. Nos. 4,457,985; 4,748,064; 4,916,000; 4,403,012; 4,623,574; and 4,737,402, all of which are incorporated herein by reference to the extent not incompatible herewith. With particular regard to fibrous materials comprising one or more woven fibrous plies, it is also typical for the warp and weft component fibers forming a single fibrous material to be oriented orthogonally to each other.

The total number of fibrous plies in each of the first fibrous layer and the second fibrous layer, and any additional fibrous layers, may be different or may be the same relative to each other, wherein the layers may be of any suitable thickness. Additionally, if a plurality of plies are to be consolidated, the individual plies of each individual fibrous layer may also remain unconsolidated prior to a single consolidation step or molding (i.e., high pressure consolidation) step to combine multiple unconsolidated fibrous layers together with the adhesive system of the disclosure in a single step, or alternatively, each layer may be pre-consolidated prior to consolidating the sections collectively into a unitary article.

The number of fibrous plies in each of the fibrous layers will affect the areal density of each layer, as will the presence of an optional polymeric binder/matrix. In preferred embodiments, each fibrous layer of the disclosure may have an areal density of about 400 $g/m^2$ or less, more preferably about 300 $g/m^2$ or less, still more preferably about 200 $g/m^2$ or less, still more preferably about 150 $g/m^2$ or less, still more preferably about 125 $g/m^2$ or less, still more preferably about 115 $g/m^2$ or less, still more preferably about 110 $g/m^2$ or less, still more preferably about 105 $g/m^2$ or less, still more preferably about 100 $g/m^2$ or less, and most preferably about 95 $g/m^2$ or less, with most preferred areal density ranges of from about 10 $g/m^2$ to about 95 $g/m^2$, to about 15 $g/m^2$ to about 95 $g/m^2$ or from about 30 $g/m^2$ to about 95 $g/m^2$.

When a stack of fibrous layers with the optional matrix is consolidated to merge the components of the stack into a monolithic element, consolidation may be conducted with or without pressure via drying, cooling, heating or a combination thereof. Pressurized consolidation is preferred for optimum bonding of the layers. Merging under heat and pressure is performed using methods that are well known, such as by the methods described in U.S. Pat. No. 6,642,159. In this regard, consolidation may be performed at temperatures ranging from about 50° C. to about 175° C., preferably from about 105° C. to about 175° C., and at pressures ranging from about 5 psig (0.034 MPa) to about 2500 psig (17 MPa), for from about 0.01 seconds to about 24 hours, preferably from about 0.02 seconds to about 2 hours. When heating, it is possible that a present polymeric binder coating can be caused to stick or flow without completely melting. Generally, if the polymeric binder material is caused to melt, relatively little pressure is required to form the composite, while if the binder material is only heated to a sticking point more pressure is typically required. As is conventionally known in the art, consolidation may be conducted in a calender set, a flat-bed laminator, a press or in an autoclave. Consolidation may also be conducted by vacuum molding the material in a mold that is placed under a vacuum. Vacuum molding technology is well known in the art. Most commonly, a plurality of orthogonal fiber webs are "glued" together with the binder polymer and run through a flat-bed laminator to improve the uniformity and strength of the bond.

Consolidation may also be performed under higher pressure conditions, a process often referred to in the art as "molding." High pressure merging of the fibrous plies may be achieved by molding under heat and pressure in a suitable molding apparatus at a pressure of from about 50 psi (344.7 kPa) to about 5,000 psi (34,470 kPa), more preferably about 100 psi (689.5 kPa) to about 3,000 psi (20,680 kPa), most preferably from about 150 psi (1,034 kPa) to about 1,500 psi (10,340 kPa). Molding may alternately be conducted at higher pressures of from about 5,000 psi (34,470 kPa) to about 15,000 psi (103,410 kPa), more preferably from about 750 psi (5,171 kPa) to about 5,000 psi, and more preferably from about 1,000 psi to about 5,000 psi. The molding step may take from about 4 seconds to about 45 minutes. Preferred molding temperatures range from about 200° F. (~93° C.) to about 350° F. (~177° C.), more preferably at a temperature from about 200° F. to about 300° F. and most preferably at a temperature from about 200° F. to about 280° F. The pressure under which the fibrous plies are molded has a direct effect on the stiffness or flexibility of the resulting molded product. Particularly, the higher the pressure at which they are molded, the higher the stiffness, and vice-versa. In addition to the molding pressure, the quantity, thickness and composition of the fibrous plies and polymeric binder coating type also directly affects the stiffness of composite.

While each of the molding and consolidation techniques described above are similar and the terms are often used interchangeably in the art, "molding" as used herein also specifically refers to a method of consolidation by bonding fibrous plies/layers together in a batch process, while "consolidation" refers to a method of merging by bonding fibrous plies/layers together in a generally continuous process. Further, molding typically involves the use of a mold, such as a shaped mold or a match-die mold when forming a flat panel, and does not necessarily result in a planar product. Normally consolidation is done in a flat-bed laminator, in a double belt or steel belt press, in a calendar nip set or by wet lamination to produce soft (flexible) body armor fabrics. In addition, molding is typically performed under relatively high pressure, while consolidation is typically performed under relatively low pressure, as discussed above. However, this is not intended to be strictly limiting and molding procedures, such as vacuum molding or autoclave molding, are often performed at relatively low pressures as determined by one skilled in the art. In either process, suitable temperatures, pressures and times are generally dependent on the type of polymeric binder coating materials, polymeric binder content, process used and fiber type.

In accordance with this disclosure, the fibrous layers are adhered to each other with a multicomponent adhesive system, which may have two different embodiments. In a first embodiment, the adhesive system is a dual layer adhesive system where two polymer layers are contacted with each other while each is wet, i.e. in liquid form. Such "wet-on-wet" application is preferred because it facilitates adhesion of the polymer layers, wherein the individual layers are unified at the surfaces where they contact each other, as polymer molecules from the polymer layers commingle with each other at their contact interfaces and at least partially fuse together. This method is particularly useful for unifying polymer layers of dissimilar polymer chemistry because it promotes their miscibility and facilitates their adherence to each other.

In a second embodiment, the adhesive system is a multicomponent system that includes three polymer layers wherein two solid polymer films are attached to each other as solid films with an intermediate adhesion promoter facilitating their adherence to each other. This method is particularly useful for attaching polymer layers of dissimilar polymer chemistry to each other but without the additional processing requirements of a wet-on-wet application system. The adhesion promoter may be in the form of an adhesive coating, an adhesive film, one or more adhesive drops or discrete deposits, etc., as would be determined by one skilled in the art.

Regarding the dual layer embodiment, as illustrated in FIG. 1 (not drawn to scale), the adhesive system comprises, consists of or consists essentially of a dual layer film 10 including a first polymer layer 12 and a second polymer layer 14, wherein the first polymer layer 12 comprises a first polymer and the second polymer layer 14 comprises a second polymer, wherein the first polymer and second polymer are different. In this embodiment, the first polymer layer 12 and the second polymer layer 14 are unified and at least partially fused together at their contact interface wherein polymer molecules from the first polymer layer are commingled with polymer molecules from the second polymer layer. These commingled molecules form a molecular entanglement region 16 at the interface of the two polymer layers 12 and 14. This molecular entanglement region 16 is most preferably formed by contacting the two polymer layers with each other while both are liquid or molten form. This may be accomplished in various ways, such as by coextrusion, blown film coextrusion, coating, dipping, etc. as would be determined by one skilled in the art. A typical coextrusion process is described in U.S. Pat. Nos. 4,677,017 and 5,139,878, which are incorporated herein by reference to the extent consistent herewith. For example, in forming a dual layer film by coextrusion, the different layers are joined together as molten polymers and then cooled. The material for the individual layers is fed into infeed hoppers of extruders of like number, each extruder handling the polymer for one of the layers. The melted polymer streams from the individual extruders are fed into a single manifold co-extrusion die. While in the die, the layers are juxtaposed and combined, and then emerge from the die as a dual layer film of the two polymeric materials. As a result of this coextrusion process, the individual polymer layers are unified at the surfaces where they contact each other as polymer molecules from the molten polymer layers commingle with each other at the contact surfaces and at least partially fuse together upon curing, wherein curing may be accomplished by various methods, such as cooling or drying, or by other appropriate methods such as UV curing or electron beam (e-beam) curing. Importantly, this is a structure not obtained by the mere pressing together of solid polymer layers via conventional lamination techniques. In a blown film process, the molten polymers are processed through a blown film apparatus including a multi-manifold circular die head through which the plasticized film compositions are forced and formed into a film bubble which may ultimately be collapsed and formed into a planar, multicomponent film.

Figure 3:
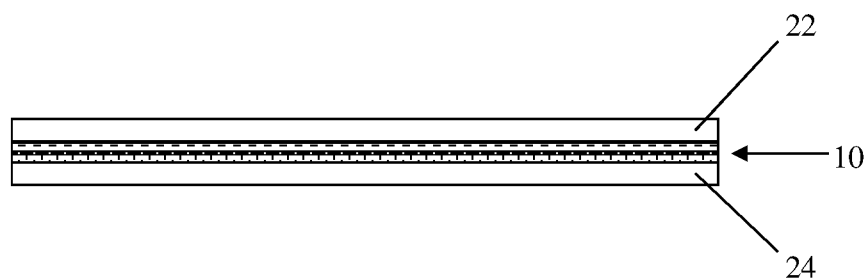
FIG. 3 is a side view schematic representation of a composite including a dual layer adhesive film.

When the adhesives are contacted with each other as liquids rather than in the form of molten polymers, the adhesives are typically in solution form wherein the polymer is dissolved in a solvent or mixed with another liquid or other fluid medium that is capable of dispersing the polymer. In this regard, the polymer may be dissolved or dispersed in any solvent or dispersing medium that is appropriate for the polymer type. Examples of solvents include water, paraffin oils and aromatic solvents or hydrocarbon solvents, with illustrative specific solvents including paraffin oil, xylene, toluene, octane, cyclohexane, methyl ethyl ketone and acetone. The techniques used to dissolve or disperse the polymers in the solvents will be those conventionally used for the coating of similar materials on a variety of substrates. Particularly preferred methods of contacting two polymers in liquid dispersion or solution form in order to thereby form a multilayer coating having a molecular entanglement region as described herein are taught in commonly-owned U.S. Pat. Nos. 7,993,478 and 7,875,563, each of which is incorporated herein by reference to the extent consistent with this disclosure. As described therein, two adhesive coatings are applied to separate substrates, with one of the substrates being one of the fibrous layers of the composite construction and with other substrate being a separable support. The two liquid adhesives are brought together, cured, and then the support is removed, leaving both layers on the fibrous layer. In the context of the present disclosure, a first liquid adhesive layer 12 may be applied to a first fibrous layer, such as fibrous layer 22 as illustrated in FIG. 3 (not drawn to scale), and a second liquid adhesive layer 14 may be applied to the surface of a support such as a silicone release film (not illustrated). The release film is then brought into contact with the fibrous layer 22 such that the two liquid adhesives are contacted with each other while both are still in liquid form. The liquids are then allowed to dry or otherwise cure, whereby they are unified at molecular entanglement region 16. The release film is then stripped away, leaving the second adhesive united with the first adhesive 12 and on the fibrous layer 22. A second fibrous layer, such as fibrous layer 24 as illustrated in FIG. 3, may then be attached to the second adhesive 14 and thereby to the first fibrous layer 22, by a process such as lamination or by pressing the second fibrous layer 24 into the second adhesive 14 under pressure and with or without heat.

In an alternative version of this embodiment, each adhesive may be applied to a release film, followed by contacting the liquid adhesives with each other whereby the polymer molecules commingle at their contact interfaces, and thereafter curing the adhesives to form a solid dual layer film. Both release films may then be removed from the formed dual layer film, and the dual layer film may then be applied as an intermediate adhesive layer in between two fabrics, such as in a lamination process. In yet another alternative embodiment, the first adhesive polymer layer 12 may be applied to the first fibrous layer 22 and the second adhesive polymer layer 14 may be applied to the second fibrous layer 24, with the two coated fibrous layers then being brought into contact with each other while both adhesives remain in liquid or molten form. Each of these alternative methods may also be used to form a dual layer film from two molten polymers rather than adhesive solutions or liquid dispersions. Generally, any useful method may be employed where the first polymer layer is contacted with the second polymer layer while each is in liquid or molten polymer form to thereby form a wet dual layer film, followed by drying or otherwise curing the wet dual layer film to thereby form a cured dual layer film, and where thereafter the first fibrous layer second fibrous layer are combined whereby the cured dual layer film is positioned as an intermediate layer between said first fibrous layer and said second fibrous layer.

Other means for forming a dual layer adhesive film 10 are also contemplated. For example, the two adhesives (12 and 14) may be in the form of liquid reactive polymer precursors, whereby they are brought into contact with each other and reacted, and whereby they are united at their contact interface. Alternatively, the adhesives may be applied onto each other in powder form, followed by melting the powders to convert the polymers into molten materials, whereby portions of the polymer molecules commingle and become entangled with each other. These molten materials are then cooled and solidified to form solid adhesive layers. In any of these embodiments, the dual layer adhesive 10 may be formed separate from the fibrous layers and then be applied to one or both of the fibrous layers, or the adhesive may be first applied to one or both of the fibrous layers followed by bringing the two adhesive components together such that they are united at their contact interface by the commingling of molecules and subsequent curing.

Figure 2:
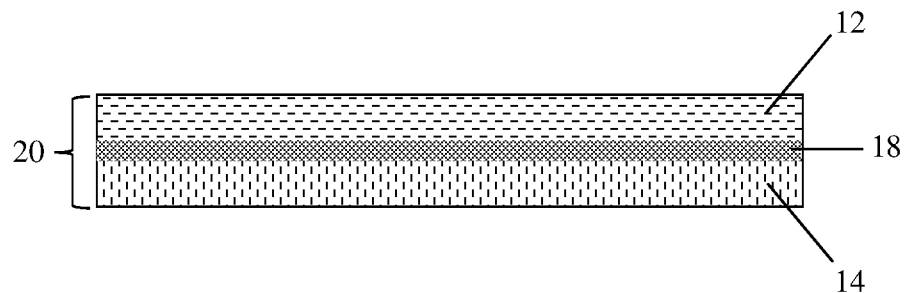
FIG. 2 is a side view schematic representation of a multi-component adhesive system including an adhesion promoter between two polymer layers.

Regarding the second embodiment, as illustrated in FIG. 2 (not drawn to scale), the adhesive system comprises, consists of or consists essentially of a tri-layer film 20 wherein a first polymer layer 12 is attached to a second polymer layer 14 with an intermediate layer of an adhesion promoter 18 applied between them to promote adhesion of the polymer layers. In this embodiment, it is particularly intended that the first and second polymer films will be contacted with each other in their solid forms, preferably as dry/cured solids, but it is also acceptable if only one of the films is in a solid, and preferably dry/cured, form. When both of the films are dry/cured solids, the adhesion promoter 18 may be applied to either layer 12 or layer 14 or to both layer 12 and layer 14. The tri-layer film 20 may be formed separately and then used as an adhesive in a lamination or molding process, or the tri-layer film may be formed on one of the fibrous layers followed by attaching the other fibrous layer in a lamination or molding process. When the tri-layer film 20 is formed separately, the polymer layers may be formed and combined using any conventional method as would be determined by one skilled in the art, such as coating, extrusion, lamination, extrusion coating and extrusion lamination techniques. Each of these techniques is well known in the art. Laminating, for example, is performed by positioning the individual layers on one another under conditions of sufficient heat and pressure to cause the layers to combine into the tri-layer film. Suitable lamination conditions are discussed below. Extrusion coating is a process where a molten polymer is applied onto a solid support and then passed onto a cooling cylinder whereupon the polymer is solidified. In a most typical embodiment, each of the first and second polymer films are first formed and dried/cured, followed by coating of the adhesion promoter onto one surface of one of the layers, and thereafter the two polymer layers are pressed together with the adhesion promoter positioned between the layers.

If desired, any of the polymer layers of the tri-layer film 20 may be uniaxially or biaxially oriented individually prior to combining the layers, and either may be submitted to a corona treatment or plasma treatment prior to combining the layers. Such techniques are well known in the art.

In either embodiment for forming a dual-layer film of tri-layer film, useful polymers for forming polymer layer 12 and polymer layer 14 may include a wide variety of thermoplastic or thermosetting polymers. Suitable thermoplastic polymer materials include polyolefin homopolymers, polyolefin copolymers, cyclic olefin homopolymers, cyclic olefin copolymers, vinyl polymers, ethylene vinyl acetate copolymers, ethylene octane copolymers, acrylonitrile copolymers, acrylic polymers, polyesters such as polyethylene terephthalate (PET) and PET copolymers, polyamides, polyvinyl chloride, polyvinylidene chloride, polycarbonates, polystyrenes, styrenic copolymers, polyisoprene, polyurethanes, fluoropolymers, ethylene vinyl acetate (EVA), ethylene ethyl acrylate, ethylene acrylic acid copolymers, as well as mixtures and copolymers of the above polymers.

Suitable polyolefins include polymers of alpha-olefin monomers having from about 3 to about 20 carbon atoms and include homopolymers, copolymers (including graft copolymers), and terpolymers of alpha-olefins. Illustrative homopolymer examples include low density polyethylene (LDPE), linear low density polyethylene (LLDPE), metallocene-linear low density polyethylene (m-LLDPE), very-low density polyethylene (VLDPE), linear very-low density polyethylene (LVLDPE), ultra low density polyethylene (ULDPE), linear ultra-low density polyethylene (LULDPE), medium density polyethylene (MDPE), linear medium density polyethylene (LMDPE), and high density polyethylene (HDPE), polypropylene, polybutylene, polybutene-1, poly-3-methylbutene-1, poly-pentene-1, poly-4,4 dimethylpentene-1, poly-3-methyl pentene-1, polyisobutylene, poly-4-methylhexene-1, poly-5-ethylhexene-1, poly-6-methylheptene-1, polyhexene-1, polyoctene-1, polynonene-1, polydecene-1, polydodecene-1 and co-polymers and mixtures thereof. Illustrative polyolefin copolymers and terpolymers include copolymers and terpolymers of alpha-olefins with other olefins such as ethylene-propylene copolymers; ethylene-butene copolymers; ethylene-pentene copolymers; ethylene-hexene copolymers; and ethylene-propylene-diene copolymers (EPDM). The term polyolefin as used herein also includes acrylonitrilebutadiene-styrene (ABS) polymers, copolymers with vinyl acetate, acrylates and methacrylates and the like. The most preferred polyolefins are ethylene polymers, copolymers, and terpolymers. The above polyolefins may be obtained by any known process. Polyolefins useful herein may have a weight average molecular weight of about 1,000 to about 1,000,000, and preferably about 10,000 to about 500,000 as measured by high performance liquid chromatography (HPLC). The most preferred polyolefins are polyethylene, polypropylene, poly-butylene and copolymers, and blends thereof. The most preferred polyolefin is polyethylene. The most preferred polyethylenes are low density polyethylenes.

Suitable polyamides non-exclusively include homopolymers or copolymers selected from aliphatic polyamides and aliphatic/aromatic polyamides having a weight average molecular weight of from about 10,000 to about 100,000. General procedures useful for the preparation of polyamides are well known to the art. Useful polyamide homopolymers include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), nylon 4,6, poly(hexamethylene adipamide) (nylon 6,6), poly(hexamethylene sebacamide) (nylon 6,10), poly(heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), poly(tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12) and the like. Useful aliphatic polyamide copolymers include caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6) and the like. Also included are other nylons which are not particularly delineated here. Of these polyamides, preferred polyamides include nylon 6, nylon 6,6, nylon 6/6,6 as well as mixtures of the same. Of these, nylon 6 is most preferred.

Aliphatic polyamides may be obtained from commercial sources or prepared in accordance with known preparatory techniques. For example, poly(caprolactam) can be obtained from AdvanSix Inc. of Morris Plains, N.J. Exemplary of aliphatic/aromatic polyamides include poly(tetramethylenediamine-co-isophthalic acid) (nylon 4,I), polyhexamethylene isophthalamide (nylon 6,I), hexamethylene adipamide/hexamethylene-isophthalamide (nylon 6,6/6I), hexamethylene adipamide/hexamethyleneterephthalamide (nylon 6,6/6T), poly (2,2,2-trimethyl hexamethylene terephthalamide), poly(m-xylylene adipamide) (MXD6), poly (p-xylylene adipamide), poly(hexamethylene terephthalamide), poly(dodecamethylene terephthalamide), polyamide 6T/6I, polyamide 6/MXDT/I, polyamide MXDI, and the like. Blends of two or more aliphatic/aromatic polyamides can also be used. Aliphatic/aromatic polyamides can be prepared by known preparative techniques or can be obtained from commercial sources. Other suitable polyamides are described in U.S. Pat. Nos. 4,826,955 and 5,541,267, which are incorporated herein by reference. Also particularly suitable for serving as one of the components of such a dual layer adhesive are the polyurethane polymers discussed in this disclosure, including both polyester and polyether based polyurethanes.

Particularly preferred polymers for adhesion promoter 18 include elastomeric materials such as polyethylene adhesives, including cross-linked polyethylene and chlorosulfonated polyethylene, ethylene copolymers, ethylene vinyl acetate (EVA), polypropylene, propylene copolymers, polybutadiene, polyisoprene, natural rubber, ethylene-propylene copolymers, ethylene-propylene-diene terpolymers, polysulfide polymers, polyurethane elastomers, polychloroprene, plasticized polyvinylchloride using one or more plasticizers that are well known in the art (such as dioctyl phthalate), butadiene acrylonitrile elastomers, poly (isobutylene-co-isoprene), polyacrylates, polyesters, unsaturated polyesters, polyethers, fluoroelastomers, silicone elastomers, copolymers of ethylene, thermoplastic elastomers, phenolics, polybutyrals, epoxy polymers, styrenic block copolymers, such as styrene-isoprene-styrene or styrene-butadiene-styrene types, and other suitable polymers that are conventionally known in the art. Also suitable are poly (ester-urethane) copolymers such as those described in U.S. Pat. No. 8,980,430, the disclosure of which is incorporated herein by reference to the extent consistent herewith, as well as those described in U.S. Pat. No. 6,887,334, the disclosure of which is also incorporated herein by reference to the extent consistent herewith. Also useful are conventionally known pressure sensitive adhesives (PSAs), epoxies, and blends of polymers with a tackifier. Such adhesion promoters may be applied, for example, in the form of a hot melt, film, paste or spray, or as a two-component liquid adhesive.

Each of the layers of multicomponent adhesives 10 and 20 may optionally also include one or more conventional additives whose uses are well known to those skilled in the art. The use of such additives may be desirable in enhancing the processing of the compositions as well as improving the products or articles formed therefrom. Examples of such include: oxidative and thermal stabilizers, lubricants, release agents, flame-retarding agents, oxidation inhibitors, dyes, pigments and other coloring agents, ultraviolet light absorbers and stabilizers, anti-microbial agents, organic or inorganic fillers including particulate and fibrous fillers, reinforcing agents, nucleators, plasticizers, as well as other conventional additives known to the art. Such may be used in amounts, for example, of up to about 30% by weight of the overall adhesive layer composition.

When the multicomponent adhesives 10 and 20 are separately fabricated and then subsequently bonded to the fabrics, they may be bonded to the surface of the first fibrous layer and/or the fibrous second fibrous layer using well known techniques, such as conventional thermal lamination techniques. In this regard, the polymer layer may be applied either before, during or after the merging together the individual fiber plies forming each individual fibrous layer 22 or 24, or before, during or after the merging together of all the collective fibrous layers into a unitary composite. Typically, laminating is done by positioning the individual layers on one another under conditions of sufficient heat and pressure to cause the layers to combine into a unitary structure. Lamination may be conducted at temperatures ranging from about 95° C. to about 200° C., preferably from about 105° C. to about 175° C., at pressures ranging from about 5 psig (0.034 MPa) to about 100 psig (0.69 MPa), for from about 5 seconds to about 36 hours, preferably from about 30 seconds to about 24 hours.

Each of the polymer films and the adhesion promoter is preferably very thin. Although each may have a different thickness, the polymer layers 12 and 14 have preferred thicknesses of from about 1 µm to about 250 µm, more preferably 5 µm to about 150 µm, more preferably from about 10 to about 100 µm, still more preferably from about 15 µm to about 100 µm, and most preferably from about 25 µm to about 100 µm. The adhesion promoter preferably has a thickness of from about 0.1 µm to about 5 µm, more preferably from about 0.25 µm to about 2.5 µm and most preferably from about 0.50 µm to about 1.5 µm. While such thicknesses are preferred, it is to be understood that other thicknesses may be produced to satisfy a particular need and yet fall within the scope of the present disclosure.

Fibrous layers 22 and 24 are to be bonded together with the multicomponent adhesive system 10 or 20 under pressure using the same consolidation/lamination or high pressure molding techniques as stated above, whereby a single, consolidated, unitary, monolithic element is formed. As when forming the individual fibrous layers 22 and 24, when forming a consolidated composite combining the fibrous layers with the adhesive system into a single, unitary composite article, all the plies/layers are overlapped on top of each other to form a stack followed by consolidating the layers together at once.

It has been found that bonding the sections together by adhesive molding or adhesive consolidation with the hybrid adhesive system described herein, the inter-laminar peel strength between the different layers is significantly improved compared to other known adhesive systems. In this regard, in preferred embodiments, the peel strength between the first fibrous layer and the second fibrous layer is at least 1 lb/inch, the peel strength between the first fibrous layer and the first polymer layer is at least 1 lb/inch and the peel strength between the second fibrous layer and the second polymer layer is at least 1 lb/inch. More preferably, the peel strength between the first fibrous layer and the second fibrous layer after consolidation into a unitary article is greater than 1.5 lbs/inch (680.4 g/inch), more preferably greater than 2.0 lbs/inch (907.2 g/inch) and most preferably greater than 2.5 lbs/inch (1134.0 g/inch). The aforementioned peel strength values are determined by the procedures of ASTM D1876.

Consistent with the objective of this disclosure, the selection of the most appropriate polymer films 12 and 14 will depend on the type of fibers forming the fibrous layers 22 and 24. In this regard, combinations of fabrics and adhesives having similar chemistries will bond uniquely well to each other, because a particular fiber type will have a naturally superior affinity for an adhesive of the same polymer type. For example, polyethylene fibers will bond better with polyolefin-based adhesives than with polyamide (nylon) based adhesives, and aramid or nylon fibers will bond better with polyamide-based adhesives. In addition, some commercially available fibrous materials are often provided by the manufacturer with protective coatings already on one or both of their planar outer surfaces, and the most appropriate selections for polymer films 12 and 14 will often depend on compatibility with said protective coatings. For example, CORDURA® brand nylon fabrics are typically sold by Invista North America S.A R.L. with a coating of a polyurethane on one of its surfaces. Accordingly, when a polymer film 12 or 14 is coupled with a CORDURA® fabric, the best bond will be achieved when said polymer film comprises a polyurethane film.

In a most preferred embodiment, the first fibrous layer comprises a woven nylon-fiber based fabric (i.e., mil-spec nylon fabric) and the second fibrous layer comprises a woven polyethylene fiber-based fabric. Accordingly, in such an embodiment, when a dual layer adhesive is used, one of the two adhesive plies of the dual layer adhesive is most preferably a polyamide polymer film and the other adhesive ply is a polyethylene (or other polyolefin) polymer film, i.e., a polyamide/polyethylene (PA/PE) dual layer adhesive, wherein the polyamide side of the adhesive is positioned in contact with the nylon-fiber based fabric and the polyethylene side of the adhesive is positioned in contact with the polyethylene fiber-based fabric. In an embodiment where the nylon-fiber based fabric is provided with a surface coating, it is most preferred that the type of polymer forming the adhesive ply that is positioned to contact the nylon-fiber is compatible with that coating. For example, if the nylon fiber-based fabric is coated with a polyurethane, e.g. a polyurethane water repellent, it is most preferred that a dual layer adhesive comprise a polyurethane/polyethylene (PU/PE) dual layer adhesive, wherein the polyurethane side of the adhesive is in contact with the polyurethane coated surface of the nylon fabric.

Importantly, the compositions of the respective components of the multicomponent adhesive system are essentially irrelevant due to the methods of forming such dual or tri-layer adhesives as described above. The two adhesive layers 12 and 14 will bond well to each other even if the polymers are dissimilar and have no natural affinity to each other. This improves the strength of the bond between the fabric layers and thereby improves the peel strength of the overall composite. In this regard, the multilayer composite articles of the disclosure achieves a bond strength between the first fibrous layer and the second fibrous layer of greater than about 450 g/inch (g/2.54 cm), more preferably greater than about 680 g/inch, more preferably from about 450 g/inch to about 1 kg/inch, more preferably from about 450 g/inch to about 910 g/inch and most preferably from about 680 g/inch to about 910 g/inch. The aforementioned peel strength values are determined by the procedures of ASTM D1876.

The composites of this disclosure are useful for the fabrication of articles that may be used in many industries where fiber strength and durability are important. Such uses include wearable articles such as safety clothing, sports apparel and outdoor wear, as well as other non-wearable articles such as gear bags and pouches, luggage, canopies, curtains, tents, parachutes, tarps, etc. In some applications, particularly non-armor applications, the fabrics may be coated with materials to improve properties such as tear resistance. abrasion resistance, cut resistance, water resistance and fire resistance. Suitable coating materials are well known in the art.

The composites of this disclosure are also particularly useful for the formation of ballistic plate carriers, such as improved scalable plate carriers, improved outer tactical vests and soldier plate carrier systems. One exemplary and commercially available type of plate carrier is the TAC PR™ Advanced Webless System from Safariland LLC of Jacksonville, Fla. as described in their U.S. Pat. No. 7,200,871. In this prior art construction, a slotted carrier is fabricated from a single fabric without a backing of high tenacity fibrous material as introduced in the present disclosure. The slots (holes) cut into the fabric are utilized as attachment points for modular accessories or for holding accessory pouches, which can pull down on the fabric and cause sagging of the fabric. This type of construction is appreciably improved when fabricated with the composite materials of the present disclosure because the enhanced composite strength resists fabric fatigue and sagging.

In one particularly preferred embodiment of this disclosure, a plate carrier article is fabricated from a consolidated composite that comprises a mil-spec nylon fabric 22 adhered to a polyethylene fabric 24 (e.g., comprising SPECTRA® UHMW PE fibers) with a dual layer adhesive film comprising a polyurethane film 12 and a polyethylene film 14. In this embodiment, if the mil-spec nylon fabric has an inside surface coated with a polyurethane, as is common with CORDURA® brand fabrics (but not all), the polyurethane film 12 is then in direct contact with said polyurethane coating, and the polyethylene film 14 is in direct contact with the polyethylene fabric 24. If there is no coating on the mil-spec nylon fabric, the polyurethane film 12 is in direct contact with the surface of the fabric 22. Additionally, if desired, an additional film may also be applied onto an outer surface of the polyethylene fabric 24 that is not in contact with the polyurethane film 14. This additional film (not illustrated) may serve various purposes in the composite construction, such as providing abrasion resistance. In one particularly intended application, said additional film is a colored polymer film that will cover, camouflage or otherwise obscure the appearance of the fabric 24 in the event that the fabric 24 becomes exposed during regular use of the plate carrier article, which is particularly susceptible to occur when the plate carrier article is designed in the form of the Safariland LLC Advanced Webless System, or the like, having holes cut through the full thickness of the entire composite, i.e., if the holes sag due to the weight of the modular attachments.

The following examples serve to illustrate preferred embodiments of the disclosure:

EXAMPLE 1

A consolidated composite laminate is fabricated that comprises a single mil-spec Mil-DTL-32439 woven nylon fabric (500 denier nylon fibers) having a camouflage pattern that is adhered to a single woven polyethylene fabric (375 denier SPECTRA® 1000 fibers; plain weave construction; pick count of 32×32 ends/inch; areal density=0.82 lb/ft$^2$). The fabrics are attached to each other by lamination with an intermediate dual layer adhesive that is a polyurethane/polyethylene (PU/PE) dual layer adhesive film. The exterior surface of the nylon is coated with a durable water repellent and the interior surface of the nylon is coated with a polyurethane coating. A black polyethylene film is laminated to the outermost surface of the woven polyethylene fabric to provide the surface of the polyethylene fabric with a dark colored appearance.

EXAMPLE 2

Example 1 is repeated except the wherein the interior surface of the nylon fabric is not coated with a polyurethane.

EXAMPLE 3

Example 1 is repeated wherein the interior surface of the nylon fabric is directly coated with a polyurethane coating and a durable water repellent is coated on top of the polyurethane coating. The durable water repellent is applied by dip coating after application of the polyurethane coating such that all surfaces of the nylon are coated with the water repellent.

EXAMPLE 4

Example 2 is repeated except the fabrics are attached to each other by lamination with an intermediate dual layer adhesive that is a polyamide/polyethylene (PA/PE) dual layer adhesive film rather than a PU/PE dual layer film.

While the present disclosure has been particularly shown and described with reference to preferred embodiments, it will be readily appreciated by those of ordinary skill in the art that various changes and modifications may be made without departing from the spirit and scope of the disclosure. It is intended that the claims be interpreted to cover the disclosed embodiment, those alternatives which have been discussed above and all equivalents thereto.

What is claimed is:

1. A ballistic resistant composite comprising:
   a) a first fibrous layer comprising one or more fibrous plies, said first fibrous layer comprising a plurality of multifilament fibers;
   b) a second fibrous layer bonded to the first fibrous layer, said second fibrous layer comprising one or more fibrous plies, said second fibrous layer comprising a plurality of multifilament fibers; and
   c) an intermediate multi-component adhesive system positioned between and attached to each of said first fibrous layer and second fibrous layer, said multi-component adhesive system bonding the first fibrous layer and the second fibrous layer to each other, wherein said multi-component adhesive system comprises at least a first polymer layer, a second polymer layer and an adhesion promoter applied between said first polymer layer and said second polymer layer, wherein the first polymer layer is positioned in contact with the first fibrous layer and the second polymer layer is positioned in contact with the second fibrous layer, wherein the first polymer layer comprises a first polymer and the second polymer layer comprises a second polymer, wherein the first polymer and second polymer are different, and wherein the adhesion promoter aids in adhering the first polymer layer and the second polymer layer to each other.

2. The ballistic resistant composite of claim 1 wherein said adhesion promoter is an adhesive film, and wherein at least one of the first fibrous layer and the second fibrous layer is a non-woven fibrous layer comprising unidirectionally oriented multifilament fibers having a tenacity of at least 20 g/denier.

3. The ballistic resistant composite of claim 1 wherein said adhesion promoter comprises one or more adhesive deposits, and wherein at least one of the first fibrous layer and the second fibrous layer comprises multifilament fibers having a tenacity of at least 27 g/denier.

4. The ballistic resistant composite of claim 1 wherein the adhesion promoter comprises a polyethylene, an ethylene copolymer, ethylene vinyl acetate (EVA), polypropylene, a propylene copolymer, polybutadiene, polyisoprene, natural rubber, an ethylene-propylene copolymers, an ethylenepropylene-diene terpolymer, a polysulfide polymer, a polyurethane elastomer, polychloroprene, plasticized polyvinylchloride, a butadiene acrylonitrile elastomer, poly(isobutylene-co-isoprene), a polyacrylate, a polyester, a polyether, a fluoroelastomer, a silicone elastomer, a phenolic, a polybutyral, an epoxy polymer, a styrenic block copolymer or a poly(ester-urethane) copolymer.

* * * * *